(No Model.)　　　　　　　　　　　　　　　　　4 Sheets—Sheet 1.
O. B. THOMPSON.
CASH REGISTER.

No. 598,584.　　　　　　　　　　　Patented Feb. 8, 1898.

Witnesses,　　　　　　　　　　　Orow B. Thompson, Inventor.
　　　　　　　　　　　　　By　James Sangster, Attorney.

(No Model.) 4 Sheets—Sheet 2.
O. B. THOMPSON.
CASH REGISTER.
No. 598,584. Patented Feb. 8, 1898.
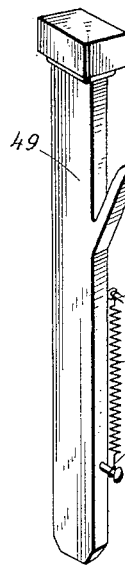
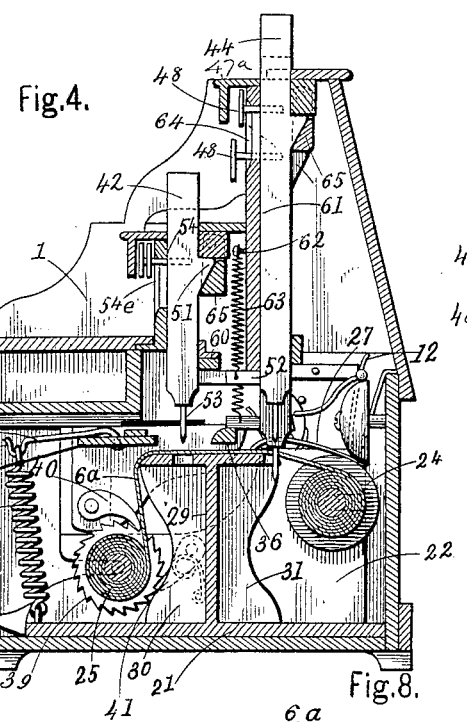
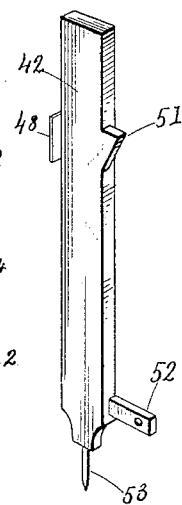
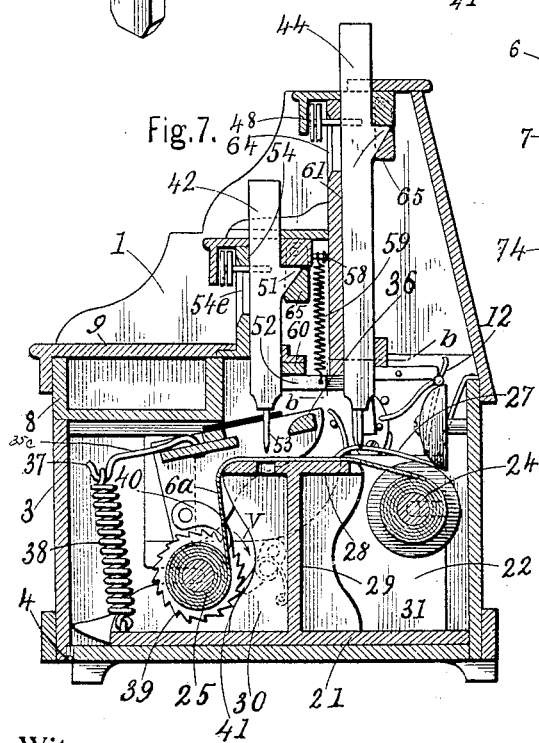
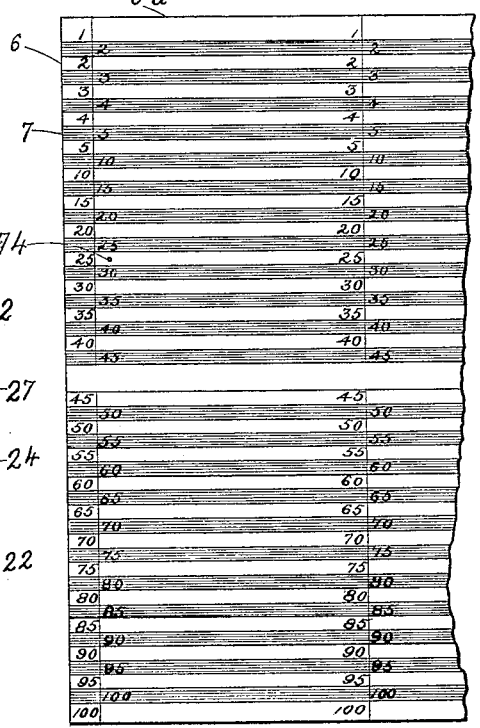
Witnesses,
A. J. Sangster
L. M. Spong.
Orow B. Thompson Inventor.
By James Scrngster Attorney.

(No Model.)  4 Sheets—Sheet 3.
O. B. THOMPSON.
CASH REGISTER.
No. 598,584. Patented Feb. 8, 1898.
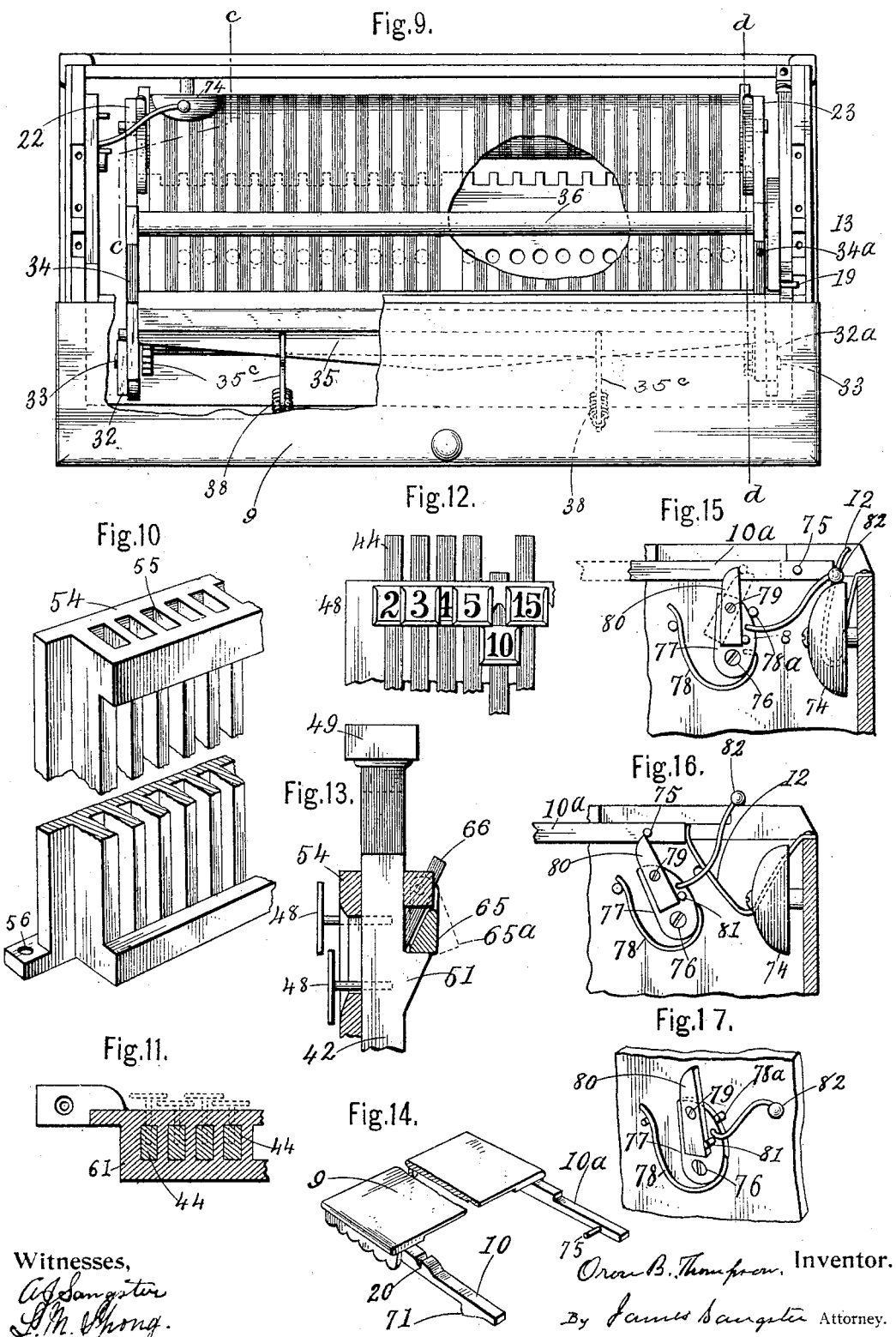

(No Model.)
O. B. THOMPSON.
CASH REGISTER.
No. 598,584. Patented Feb. 8, 1898.
4 Sheets—Sheet 4.
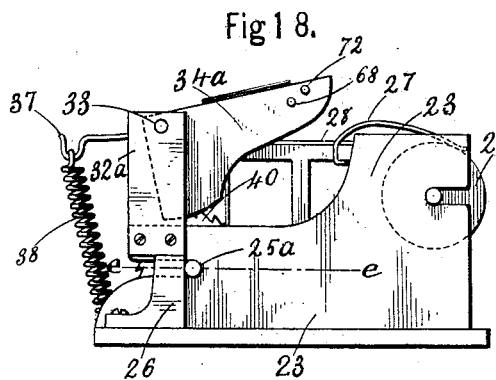
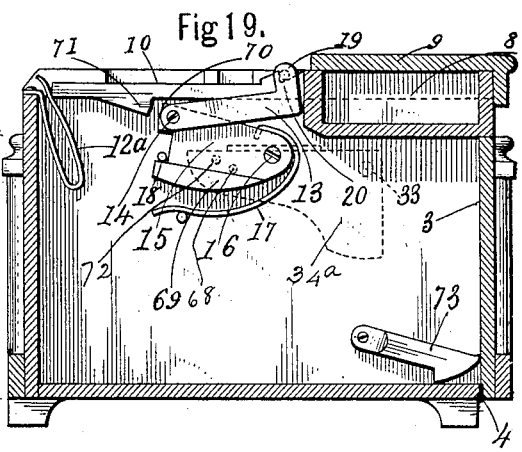
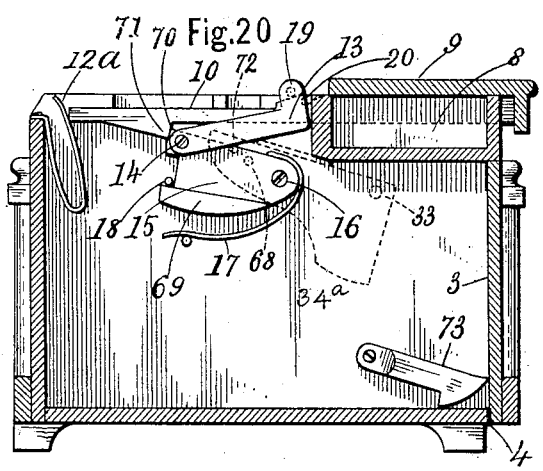
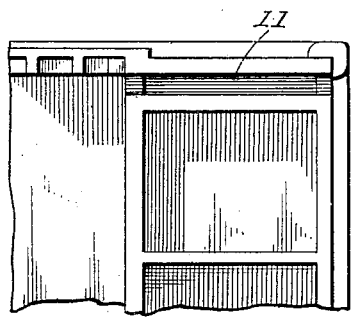
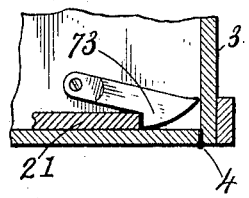
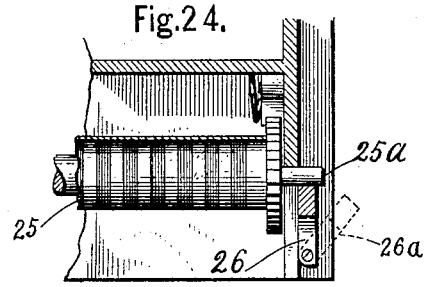
Witnesses,
Oron B. Thompson Inventor.
By James Sangster Attorney.

UNITED STATES PATENT OFFICE

ORON B. THOMPSON, OF BAY MILLS, MICHIGAN, ASSIGNOR TO HENRY SHUART, OF BUFFALO, NEW YORK.

CASH-REGISTER.

SPECIFICATION forming part of Letters Patent No. 598,584, dated February 8, 1898.

Application filed February 26, 1896. Serial No. 580,898. (No model.)

*To all whom it may concern:*

Be it known that I, ORON B. THOMPSON, a citizen of the United States, residing at Bay Mills, in the county of Chippewa and State of Michigan, have invented certain new and useful Improvements in Cash-Registers, of which the following is a specification.

My invention relates to certain improvements in cash-registers by which the device is rendered simple in its construction and effective in its operation and whereby a record is kept upon paper showing each separate amount as received, each separate amount being shown in its own column, all of which will be fully and clearly hereinafter described and claimed, reference being had to the accompanying drawings, in which—

Figure 1:
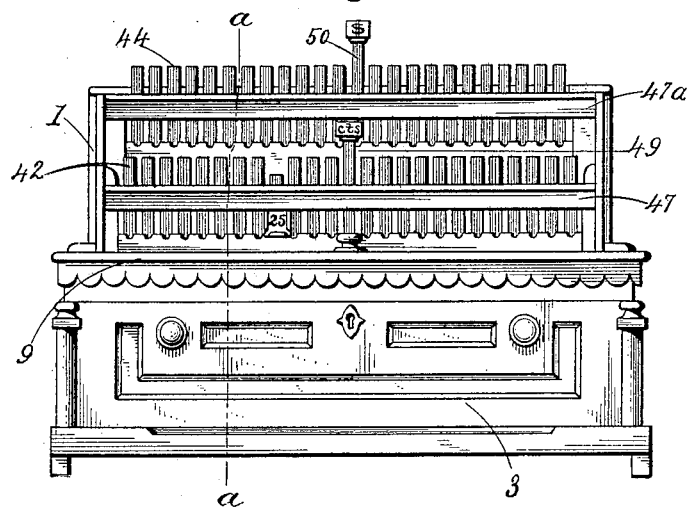
Figure 2:
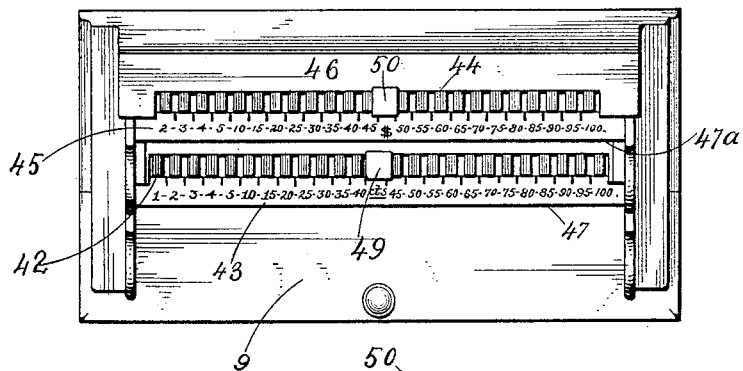
Figure 3:
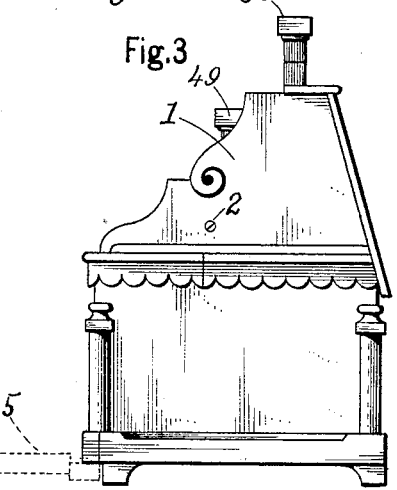

Figure 1 represents a front elevation of the device complete, showing one of the keys depressed and exposing the amount indicated thereby. Fig. 2 represents a top plan view showing the keys and the amounts indicated by them opposite each key. Fig. 3 represents an end view of the register, showing the two releasing-keys, the object of which will appear farther on. Fig. 4 represents a vertical transverse section on or about line $a\,a$, Fig. 1, showing one of the indicating-keys in its lower position. Fig. 5 is a detached perspective view of one of the releasing-keys, showing also the spiral spring connected with it. Fig. 6 represents a detached perspective view of one of the perforating indicating-keys. Fig. 7 represents a section on or about line $a\,a$, Fig. 1, showing one of the indicating-keys in its upward position. Fig. 8 represents a face view of a portion of the paper used in this machine. Fig. 9 is a top plan view of the lower portion of the machine, the key-case being omitted to expose the mechanism below it. Fig. 10 represents a perspective view of a portion of the slideway-frame for the indicating-keys. Fig. 11 is a horizontal section on or about line $b\,b$, Fig. 7. Fig. 12 represents an enlarged front view of a portion of the frame for holding the keys for the purpose of showing how the indicating-cards are placed, one of said cards being shown in its exposed position. Fig. 13 is an enlarged vertical section through the slideway-frame, showing the manner of holding one of the indicating-keys after being depressed. Fig. 14 is a perspective view of the cover of the cash-receptacle. Fig. 15 is a vertical section on or about line $c\,c$, Fig. 9, showing the mechanism for operating the bell. Fig. 16 is a similar view showing the hammer of the bell raised just before striking. Fig. 17 represents a perspective view of the mechanism for striking the bell. Fig. 18 is a side elevation of the frame for holding the paper, showing it removed from the holding-case. Fig. 19 is a vertical section on or about line $d\,d$, Fig. 9, showing the mechanism for locking the cash-receptacle cover in its full locked position, the paper-frame being omitted. Fig. 20 is a similar section showing the cash-receptacle cover half unlocked. Fig. 21 is also a similar section showing the cash-receptacle cover unlocked and open. Fig. 22 is a top plan view of a portion of the cash-receptacle, showing one of the slideways for the extension of the cover of the cash-receptacle to slide in. Fig. 23 is a vertical section showing the means for holding the paper-frame in the case. Fig. 24 is a horizontal section on or about line $e\,e$, Fig. 18, showing the manner of holding the front paper-roll in the frame. Fig. 25 is a perspective view of one of the key-stops.

Referring to the details of construction, as shown in said drawings, the lower portion or case is made either of wood or metal, cast-iron nickel-plated being preferred, although wood may be used, if desired. The upper portion of the case 1 is made easily removable by taking out a screw 2 at each end (see Fig. 3) and then lifting it off, thereby exposing the mechanism, which is mounted and supported within the lower portion of the case. The base or lower portion of the case is provided with a front portion 3, extending its entire length and secured thereto by hinges 4 at the bottom edge, (see Figs. 4 and 7,) so the entire front portion below the cash-receptacle can be turned on its hinges forward and down to the position shown in Fig. 3 by the dotted lines 5, thus giving access to the paper.

In this machine I employ a sheet or roll of peculiarly ruled and marked paper whereby a complete and perfect record is kept of all amounts received during the operation of the machine. A portion of a roll of this paper is illustrated in Fig. 8, as will be seen, by its surface being made up of a series of dark and light parallel spaces 6 and 7. The figures in the light spaces indicate the cents and the figures in the dark spaces indicate the dollars. The object of having this paper ruled and marked as above set forth will be fully described farther on.

The front top portion of the lower part of the case is provided with a money-receptacle 8, rigidly secured in place thereto, or if made of cast metal it may be in one integral piece with the lower portion of the case. At the top of the money-receptacle is a sliding cover 9. A detached view of this cover is shown in Fig. 14. The two extension bars 10 and $10^a$ fit and slide in grooves 11, of which there are two, one at each end of the machine, one being shown in Fig. 22, the extension bar 10 having a notch 20 and a projection 71. This cover is held shut or in its closed position against the force of the springs 12 and $12^a$, one at each inner end of the machine, (see Figs. 4, 7, 16, 19, 20, and 21,) as follows: An angular arm 13 is pivotally connected by a pin 14 to an arm 15. This arm 15 is also pivotally connected to the inner side of one end of the lower case or box by a pin 16. A spring 17 moves and keeps said arm 15 upward until stopped by its notched end striking against a pin 18, extending from the inner side of the lower case or box, in which it is located. At the top of the angular arm 13 is rigidly secured a pin 19, extending outward. (See Fig. 9, this pin being also shown in Figs. 19, 20, and 21 by dotted lines.) The arm 13 turns easily on its pivot 14, so that the end, with its pin 19, drops downward by gravity. In the end of the rearward extension bar 10 of the cover 9 is a notch 20. It will now be apparent that if the cover 9 be pushed inward from the position shown in Fig. 21 the end of the extension bar 10 will be forced against the spring $12^a$, thereby compressing it, and that when it is pushed into the position shown in Fig. 19 the notch 20 will come under the pin 19, so that it will fall into it and thereby fully secure the cover in its closed position, as shown in said Fig. 19.

The paper-holding frame consists of the base portion 21 and two upright side frame portions 22 23. (See Figs. 4, 7, 9, and 18.) Between the two side frame portions are mounted in suitable bearings two rollers 24 and 25 for carrying the paper $6^a$. The front roller 25 is kept in place by means of an upright pivoted portion 26, one at each side frame-piece, (see Fig. 18, where one is shown, also Fig. 24,) which can be turned around flat against the side, as in Fig. 18, so as to hold the journal $25^a$ as shown in said figure. When it is desired to take the roller out, all that is required is to turn the parts 26 outward, substantially as shown by dotted lines $26^a$ in Fig. 24. The roller 24 requires nothing to hold it in place because the drawing of the paper off from it tends to draw it in instead of out of place, the roller 24 being kept from turning too freely by a friction-spring 27, which rests on the roller, as shown in Figs. 4 and 7. The paper is drawn off from the roller 24 over the table 28 and onto the roller 25. This table 28 is supported on a vertical support 29, which extends the whole distance between the two side frame-pieces 22 and 23 and is provided with side braces 30 and 31. (See Figs. 4 and 7.)

To each side of the paper-holding-frame pieces 22 and 23 are secured two upright supporting frame-pieces 32 and $32^a$. (See Figs. 9 and 18.) Between these upright frame-pieces are pivoted by pins 33 (also shown in Figs. 9 and 18) two side frame-pieces 34 and $34^a$, adapted to swing on said supporting-pieces 32 and $32^a$. On the movable side frame-pieces 34 and $34^a$ is firmly fastened near the pivotal centers 33 a longitudinal supporting-bar 35, and secured to said bar are two rods $35^c$, extending outward, each having a hook 37, to which is secured a spiral spring 38, extending down to the base and secured thereto. (See Figs. 4, 7, and 9.) Near the opposite ends of the side frame-pieces 34 and $34^a$ is rigidly secured parallel with the supporting-bar 35 an operating-bar 36. The object of the springs 38 is to hold that portion of the side frame-pieces 34 and $34^a$ carrying the operating-bar 36 in its upward position, substantially as shown in Fig. 7. It is shown in its downward position in Fig. 4. At each end of the lower or front roller 25 is rigidly secured a ratchet-wheel 39, and to the lower portion of each pivoted side frame-piece 34 and $34^a$ is pivoted a feeding-pawl 40, adapted to engage with the teeth in the ratchet-wheels 39. Beside each of the ratchet-wheels 39 is a retaining-pawl 41 for preventing the ratchet-wheels 39 from moving backward. (See Figs. 4 and 7, where the pawl 40 is shown, the retaining-pawl 41 being also shown partly in dotted lines in the same figures.)

From the above-described construction it will be seen that by rocking or swinging the bar 36 and its pivoted side supporting-frames 34 $34^a$ the roller 25 and ratchet-wheels 39 will be made to rotate in the direction of the arrow V, Fig. 7, and thereby roll the paper $6^a$ on the roller 25 while drawing it from the roller 24.

Two series of keys are used in this machine, the keys 42 of the first series representing cents, from one cent up to one dollar, the value of each key 42 being designated by figures 43, located directly in front of each key on the top of a concealing-bar, as shown at 47 in Fig. 2, and in or about the center on the releasing-key is the word "Cents." The keys 44 of the second series represent dollars and are set back of the first series. At the front of each key is a number indicating its value, substantially as shown in Fig. 2, and in or about the center of this row of figures 45 is a dollar-mark 46, (see Fig. 2,) and also on the releasing-key. (See Fig. 1.) The concealing-bars 47 and 47ª extend along the front of the machine, and back of both of said bars 47 and 47ª is an indicating-plate 48, fastened to each and every key—that is, each key, except the releasing-keys, is provided with an independent indicating-plate and having a number on it indicating its value, which corresponds with the number in front of it on the concealing-bar. These plates are only brought to view when a key is depressed, the indicating-number "25" being exposed to view by a depressed key in Fig. 1. When the keys are all up in their normal position, these figures are behind the concealing-bars 47 and 47ª. (See the upper row of keys in Fig. 1 and its concealing-bar 47ª. See also Figs. 11 and 12, where some of the keys and their indicating-plates are shown, the concealing-plate being omitted.)

At or about the center of the first row of keys for indicating cents is the releasing-key 49, having the word "Cents" on its front face. The dollar-row of keys is also provided with a similar releasing-key 50, having the dollar-mark on its front face. (See Figs. 1, 2, and 3, where these releasing-keys are shown.) The object of these keys will be fully described farther on.

The keys 42 and 44 are each provided with an indicating-plate 48, as hereinbefore mentioned, on which is placed in any well-known way—by printing, for instance—a number indicating the value of the key, the object of the plates 48 and their numbers being to indicate to the purchaser the amount of his purchase. The keys 42 and 44 are also each provided with a wedge-shaped portion 51, an outwardly-extending bar 52, and a steel perforating-pin 53 at its lower end. (See Fig. 6, where one of these keys 42 is shown, the keys 44 being the same, except that they are longer than the keys 42.)

The keys 42 are supported in a slideway-frame 54. (See Figs. 4, 7, 10, and 13.) The frame 54 is simply a support for the keys, having slideways 55 (see Fig. 10) for the keys to slide easily up or down therein. Consequently the particular form of the slideway is unimportant. It extends along the front of the case sufficiently to receive all the keys and is firmly attached to the holding-case by screws which pass through holes 56. (See Fig. 10.) In front of the slideway-frame 54, opposite each key, is a slot 54ᶜ, through which a pin supporting the indicating-plate 48 passes and has room to move up or down with the key. To a stationary support on the slideway-frame 54 (see Fig. 7) is secured a series of holding-pins 58, corresponding in number with the keys 42. A spring 59 (spiral spring being preferred) is secured to each pin 58, and its lower end is secured to the bar 52, extending out from each key 42. The object of the springs 59 is to hold the keys normally in a raised position and allow them to be pressed down against a yielding force and to spring up again to their normal position the moment they are released. They are stopped from going up too far by the portions 52 coming against a bar 60, which extends along back of all the keys and is secured at each end to the holding-case. The keys 44 are also supported in a similar frame 61, (see Figs. 4 and 7, also Fig. 11,) which is a horizontal section through a portion of the keys 44 and the frame in which they move or slide up and down. To a stationary support on the sliding frame portion 61 is firmly secured a series of holding-pins 62, (see Fig. 4, where this is shown,) one pin 62 being opposite each key 44. To each of these pins 62 the upper portion of a spiral spring 63 is attached, its lower end being attached to the extension 52 on said key 44, the object of said spring 63 being the same as that of the springs 59. The keys 44 are limited in their up and down movements by means of the slots 64 in the slideway portion 61, through which the pins supporting the indicating-plates 48 pass. (See Fig. 4, where this is shown.) It will be seen from the above description that the springs 59 and 63 are located alternately side by side, one for each opposite key.

Pivoted back of each row of keys to each end of their slideway supporting-frame is a locking-bar 65. (See Figs. 4, 7, and 13 and the detached perspective view shown in Fig. 25, to which reference is made in describing this bar.) This locking-bar is triangular in cross-section and is provided with two pivotal ears 66 and 66ª. Its office is to hold the key when pushed down. It swings loosely on its pivots, so that when turned outward and slightly upward and released it will instantly swing back to its normal position again. Now by referring to Fig. 13 it will be seen that when a key—42, for instance—is pressed down, as shown in said Fig. 13, the inclined or wedge-shaped catch 51, passing down below the bar 65, pushes it out, as shown by the dotted lines 65ª in said Fig. 13, and when the point of the catch 51 passes below the lower edge of the locking-bar 65 said bar will instantly swing back to its normal position, so that the portion 51 rests up against the bottom of the bar 65 and thereby holds the key down, as shown in said Fig. 13. By this construction it will be seen that any key in the series can be operated in this way. To release any key while in this position, all that is necessary to do is to press down on the releasing-key of its series as follows, reference being had to Fig. 13: The releasing-keys are each provided with an upwardly-inclined extension-piece 66. (See also Fig. 5, where this is shown.) It will now be seen that by pressing the releasing-key down the part 66 will again force the bar 65 out to the position shown in Fig. 13 by the dotted lines 65ª, and thereby allow the spiral springs 59 connected with that bar to instantly draw it up to its normal position. The releasing-keys cannot be pressed down far enough to be caught by the bar 65. Consequently they spring upward the moment they are released, a spiral spring similar to the springs 59 or 63 being attached to the pin 67 (shown in Fig. 5) at its lower end and having its upper end attached to a pin 58 or 62, exactly the same as the rest of the keys, so that its action when released is the same.

The paper-holding frame and case, when put into the base or lower portion of the holding-case through the hinged side 3, is secured in place by a pivoted catch 73.

The bell 74 (see Figs. 15, 16, and 17) is operated at the same time the cover 9 is forced out, by means of a pin 75 on the cover extension-bar 10$^a$. (See Fig. 14.) On one side of the paper-holding case is pivoted by a screw 76 so as to turn easily thereon a short arm 77, provided with a stop-pin 81, a spring 78 pressing said arm 77 against the stop 78$^a$, or in the position shown in Fig. 15. To the arm 77 is loosely pivoted, by a pin 79, a counterweighted arm 80. The bell-hammer 82 is also rigidly secured to the arm 77.

From the above description it will be seen that when the cover is forced outward the pin 75 comes in contact with the point of the counterweighted arm 80 and turns it on its pivot 79 until its lower end (which is the heaviest) comes in contact with the pin 81, when it moves the arm 77 against the force of the spring 78 until the pin 75 passes the point of the arm 80, when the spring 78 acts and forces the bell-hammer 82 against the bell and thereby sounds an alarm.

In operating with this machine the first thing to be done is to push down one of the keys denoting the amount received—the twenty-five-cent key, for instance. (Shown in Fig. 1.) This operation brings the wedge portion 51 (see Fig. 13) under the pivoted bar 65 to the position shown in said Fig. 13, so that the key is thereby locked and held down. At the same time the bar 52, extending out from the key, has pushed the bar 36 on the supporting-frame 34 and 34$^a$ down from its position shown in Fig. 7 to the position shown in Fig. 4. During this downward movement of the supporting-frame 34 34$^a$ and its operating-bar 36 a pin 68, extending outward from the side frame 34$^a$, (see Fig. 18, the pin 68 also being shown by dotted lines in Figs. 20 and 21,) is moved down on an outward side extending portion 69 of the arm 15, thereby turning it on its pivot 16 down from its position shown in Fig. 20 to its position shown in Fig. 21. This operation causes the upper corner 70 of the pivoted bar 15 to move down out of engagement with the catch 71 on the extension 10 on the money-receptacle cover, thereby releasing it and allowing the springs 12 and 12$^a$ to act and throw the cash-box cover 9 out, as shown in Fig. 21. This is the first operation of the machine. It leaves the bar 36 and the pivoted frame on which it is mounted down in its lowest position and the machine in condition for continuous operation thereafter. Now when the cover 9 is pushed back to cover the money-receptacle another element is brought into action. When the cover 9 is pushed back, it causes the engagement of the pin 19 on the arm 13 with the notch 20 in the extension-bar 10 on said cover 9, as hereinbefore described, thereby holding it in its closed position. The operation now is to first move down one of the releasing-keys 49 or 50 in the series of keys operated. This movement causes the pivoted bar 65 to be forced outward to the position shown by the dotted lines 65$^a$ in Fig. 13, thereby releasing the key denoting the amount received, which had been previously pressed downward by the first operation, and allowing its spring to act and bring it up to its normal position. At the same time the bar 36 and its frame on which it is mounted being released by the extension-bar 52 moving up with the key away from said bar allows its springs 38 to act and move it upward from the position shown in Fig. 4 to the position shown in Figs. 7 or 18. This operation causes the pin 72, which extends out from the side frame 34$^a$, (see Fig. 18, also Figs. 20 and 21, where the pin 72 is shown by dotted lines,) to move up against the arm 13 and throw its pin 19 out of engagement with the notch 20, thus permitting the cover 9 to move outward from its position shown in Fig. 19 to the position shown in Fig. 20, and thereby bring the parts 70 and 71 into engagement, as shown in said Fig. 20, which only half unlocks the cover 9 and leaves it in its normal position. The next operation consists in repeating the first operation above described—that is, pushing down a key denoting the amount raised, thereby releasing the cover 9 and allowing the springs 12 and 12$^a$ to throw it open, as hereinbefore set forth. At the same time the above operation is going on when a key is pushed down the pin 53 passes down through the paper and perforates it. If perforated in a dark line, the amount recorded will be dollars, if in a light line it will be cents. I will refer to the key shown in Fig. 1, which is pushed down, and its plate 48 shows its value to be twenty-five cents, indicating that the above amount has been received. Then the perforation in the paper (indicated 74 in Fig. 8) would show that the twenty-five-cent key had been used. By this means the number of perforations in that light line would show how many times twenty-five cents had been received during the day. The same is true with all the other lines as to the amounts represented therein, and the amounts in each can easily be calculated when required. It will be noticed that the dark and light parallel spaces are provided with a number of figures indicating the same amounts in the same line or space. The reason for this is that it is easier to see in which line the different amounts indicated belong. While the pin 53 is going down into and through the paper the ratchet-wheels 39 remain stationary and the pawls 40 are moving back over the ratchet-teeth. They move over one tooth and nearly over the next tooth, so that in moving forward the pawl 40 has to move nearly the length of a tooth before it reaches the next and starts the ratchet to turn and move the paper one step forward, during which time the pin 53 has moved up out of the paper before it starts to move, whereby the paper is not torn and the perforations are perfectly true and clear and distinct.

I claim as my invention—

1. In a cash-register, having a cash-receptacle, the combination with a cash-receptacle cover mounted in slideways and provided with an extension-bar, of an indicating-key, a slideway supporting-frame in which said key is mounted, means for keeping said key normally in a raised position, a locking-bar, a pivoted frame carrying an operating-bar 36, springs for keeping the pivoted frame normally in a raised position, means on the indicating-key for operating the bar 36, a pin 72, on the pivoted frame, and a pivoted arm having a spring for keeping it in its normal position, a projection on said arm upon which said pin strikes and disengages said arm from a notch 71, on the cover extension-bar thereby releasing it, and springs for ejecting said cover, substantially as described.

2. In a cash-register, having a cash-receptacle, the combination with a cash-receptacle cover mounted in slideways, of a releasing-key provided with an inclined extension-piece, an indicating-key, a slideway supporting-frame in which said key is mounted, means for keeping said keys normally in a raised position, a locking-bar, a pivoted frame provided with springs for keeping it normally in a raised position and carrying an operating-bar 36, means on the indicating-key for operating the bar 36, a pivoted arm provided with a spring for keeping it in its normal position and carrying an arm 13, pivoted thereto, a pin 19, on the arm 13, for engaging with the notch 20, on the cover extension-bar, a pin 72, on the operating-bar frames for throwing the arm 13, out of engagement with the notch 20, by the action of the releasing-key and thereby half unlocking the cover, and a pin 68, for operating the arm 15, and releasing the cover substantially as described.

3. In a cash-register, the combination with a series of indicating-keys, of springs for holding said keys in their normally raised position, mechanism for locking any one of said keys in its position when depressed, and also releasing and opening the cash-receptacle, mechanism for locking the cash-receptacle when returned to its normally closed condition until the depressed indicating-key is restored to its normally raised condition, and key mechanism for releasing the depressed indicating-key and allowing it to resume its normally raised position, as set forth.

4. In a cash-register, the combination of two parallel series of indicating-keys arranged in a supporting slideway-frame, one series denoting "dollars" above the series denoting "cents," perforating-pins at the lower ends of said keys, springs for keeping said keys normally in a raised position, a pivoted locking-bar and a releasing-key, springs for holding it in its normal position, an inclined extension-piece for unlocking the locking-bar and allowing the key to resume its normal position, rollers carrying recording-rolls of paper, the surface of said paper consisting of a series of alternate dark and light parallel spaces, the dark spaces corresponding in number to and arranged so as to allow perforation by the dollar-indicating keys and the light spaces corresponding in number to and arranged so as to allow perforation by the cent-indicating keys, as set forth.

5. In a cash-register, the combination of two parallel series of indicating-keys, springs for holding said keys normally in a raised position, perforating mechanism at the lower ends of said keys, rollers carrying recording-rolls of papers provided with a series of parallel spaces corresponding in number to the indicating-keys, and arranged so as to be perforated by the depressing of said keys, mechanism for locking any one of said keys in its position when depressed, and also releasing and opening the cash-receptacle, mechanism for locking the said cash-receptacle when reclosed until the depressed indicating-key is restored to its raised position, key mechanism for releasing said depressed indicating-key and restoring it to its normally raised condition and mechanism for intermittently operating the rollers and thus moving the recording-paper one step forward after each perforation, as set forth.

6. In a cash-register, the combination with a series of indicating-keys, of mechanism actuated by the depressing of any one of said keys for releasing and opening the cash-receptacle and also registering the amount which the said depressed key indicates upon a recording-roll, mechanism for locking said key in its depressed position, and also locking the cash-receptacle against releasal until said depressed indicating-key returns to its raised position, and releasing-keys, the depressing of which unlocks said depressed indicating-key and allows it to resume its normally raised position, as set forth.

7. In a cash-register, the combination with a series of indicating-keys, of springs for normally holding said keys in a raised position with a spring force, mechanism actuated by the depressing of any one of said keys, for releasing and opening the cash-receptacle, for exposing a device indicating the amount placed therein and also registering the said amount on a recording-roll, mechanism for locking said key in its depressed position, mechanism for locking the cash-receptacle when reclosed against releasure by the depressing of one or more of the raised indicating-keys until the depressed key is returned to its raised position, and key mechanism for releasing the depressed indicating-key.

8. In a cash-register, the combination with the indicating-keys, of step-by-step mechanism for releasing and opening the cash-receptacle upon the depressing of any one of said keys; for exposing a device indicating the amount; for registering the said amount on a recording-roll; for locking said key in its depressed position; for locking the cash-receptacle against releasure when reclosed until the depressed indicating-key is restored to its original position; and for restoring said key to its original position.

ORON B. THOMPSON.

Witnesses:
    JAMES SANGSTER,
    L. M. SPONG.